US005582917A

United States Patent [19]

Chen et al.

[11] Patent Number: 5,582,917

[45] Date of Patent: Dec. 10, 1996

[54] FLUOROCARBON-SILICONE COATED ARTICLES USEFUL AS TONER FUSING MEMBERS

[75] Inventors: Jiann H. Chen, Fairport; Tsang J. Chen; Lawrence P. Demejo, both of Rochester; Gary F. Roberts, Macedon, all of N.Y.

[73] Assignee: Eastman Kodak Company, Rochester, N.Y.

[21] Appl. No.: 122,754

[22] Filed: Sep. 16, 1993

Related U.S. Application Data

[63] Continuation-in-part of Ser. No. 940,582, Sep. 4, 1992, abandoned.

[51] Int. Cl.[6] .................... B32B 27/30

[52] U.S. Cl. .................... 428/421; 355/279; 355/289; 428/422; 428/447; 430/99; 430/124; 492/56; 492/59

[58] Field of Search .................... 428/421, 422, 428/447; 355/279, 289; 430/99, 124; 492/56, 59; 219/216, 388

[56] References Cited

U.S. PATENT DOCUMENTS

| | | | |
|---|---|---|---|
| 3,965,853 | 6/1976 | Moser | 118/60 |
| 4,000,957 | 1/1977 | Ruhland | 427/22 |
| 4,065,585 | 12/1977 | Jelfo et al. | 427/11 |
| 4,257,699 | 3/1981 | Lentz | 355/3 FU |
| 4,264,181 | 4/1981 | Lentz et al. | 355/3 FU |
| 4,272,179 | 6/1981 | Seanor | 355/3 FU |
| 4,387,176 | 6/1983 | Frye | 524/268 |
| 4,430,406 | 2/1984 | Newkirk et al. | 430/99 |
| 4,522,866 | 11/1985 | Nishikawa et al. | 428/216 |
| 4,536,529 | 8/1985 | Frye et al. | 524/284 |
| 4,711,818 | 12/1987 | Henry | 428/421 |
| 4,763,158 | 8/1988 | Schlueter, Jr. | 355/3 FU |
| 4,810,564 | 3/1989 | Takahashi et al. | 428/213 |
| 4,853,737 | 8/1989 | Hartley et al. | 355/289 |
| 4,910,559 | 3/1990 | Kuge et al. | 355/285 |
| 4,970,098 | 11/1990 | Ayala-Esquilin | 428/36.4 |
| 5,035,950 | 7/1991 | Del Rosario | 428/421 |
| 5,166,031 | 11/1992 | Badesha et al. | 430/124 |
| 5,200,284 | 4/1993 | Chen et al. | 430/33 |

FOREIGN PATENT DOCUMENTS

| | | |
|---|---|---|
| 291081 | 11/1988 | European Pat. Off. . |
| 2542407 | 4/1976 | Germany . |

OTHER PUBLICATIONS

Research Disclosure 27567, anonymous, Fuser Blade Oiler, Mar. 1987, p. 172.

IBM Technical Disclosure Bulletin, Wilbur, C. V., "Improved Fuser For Electrophotography", Dec. 1978, vol. 21, No. 7.

P. Pawar, Flame–Retardant Polyolefins Don't Need Halogen, Plastics Technology, Mar. 1990. pp. 75–79.

*Primary Examiner*—D. S. Nakarani
*Attorney, Agent, or Firm*—Anne B. Kiernan

[57] ABSTRACT

Toner fusing members having a surface layer comprising a substrate coated with a fluorocarbon-silicone polymeric composition are obtained by concurrently curing a fluorocarbon copolymer, a nucleophilic fluorocarbon-curing agent and a heat-curable polyfunctional polymethylsiloxane polymer.

15 Claims, 3 Drawing Sheets

FLUOROCARBON-SILICONE COATED ARTICLES USEFUL AS TONER FUSING MEMBERS

This is a Continuation-In-Part of application Ser. No. 07/940,582 filed on Sep. 04, 1992, now abandoned.

FIELD OF THE INVENTION

This invention relates to toner fusing members and, more particularly, to such members coated with a fluorocarbon-silicone polymeric composition.

BACKGROUND OF THE INVENTION

In certain electrostatographic imaging and recording processes, for instance, in electrophotographic copying processes, an electrostatic latent image formed on a photoconductive surface is developed with a developer which is a mixture of carrier particles, e.g., magnetic particles, and a thermoplastic toner powder which is thereafter fused to a receiver such as a sheet of paper. The fusing member can be a roll, belt or any surface having a suitable shape for fixing thermoplastic toner powder images to a substrate. The fusing step commonly consists of passing the substrate, such as a sheet of paper on which toner powder is distributed in an imagewise pattern, through the nip of a pair of rolls, at least one of which is heated. Where the fusing member is a belt it is preferably a flexible endless belt having a smooth, hardened outer surface which passes around a heated roller. A persistent problem in this operation is that when the toner is heated during contact with the heated roll or belt it may adhere not only to the paper but also to the fusing member. Any toner remaining adhered to the member can cause a false offset image to appear on the next sheet and can also degrade the fusing member. Other potential problems are thermal degradation and abrasion of the member surface which results in an uneven surface and defective patterns in thermally fixed images.

Toner fusing rolls have a cylindrical core which may contain a heat source in its interior, and a resilient covering layer formed directly or indirectly on the surface of the core. Roll coverings are commonly fluorocarbon polymers or silicone polymers, such as poly(dimethylsiloxane) polymers, of low surface energy which minimizes adherence of toner to the roll. Frequently release oils composed of, for example, poly(dimethylsiloxanes), are also applied to the roll surface to prevent adherence of toner to the roll. Such release oils may interact with the roll surface upon repeated use and in time cause swelling, softening and degradation of the roll. Silicone rubber covering layers which are insufficiently resistant to release oils and cleaning solvents are also susceptible to delamination of the roll cover after repeated heating and cooling cycles.

Toner fusing belts are composed of a continuous flexible material having superior resistance to heat and a smooth surface. The belt substrate can be metallic or polymeric. The surface of the belt is composed of a thinly coated, low surface-energy polymer such as a fluorocarbon or a silicone-polymer.

Fusing members with a surface coating of a fluoroelastomer, especially vinylidene fluoride based fluoroelastomers, possess excellent heat, oil and chemical resistance as well as good fatigue and wear characteristics. However, fluoroelastomers with these excellent chemical and mechanical properties have a propensity to interact with toners, especially those formulated from polyesters, causing premature offsets.

U.S. Pat. No. 4,264,181 discloses fusing members coated with a metal-filled elastomer surface obtained by nucleophilic-addition curing of a mixture of a metal filler and a vinylidene fluoride-hexafluoropropylene copolymer. Mixtures of the fluoroelastomers with silicone rubbers are also contemplated (column 8, lines 26–29) but no specific examples of suitable silicones are taught. The surface coatings disclosed are used in conjunction with functionally substituted polymeric release agents capable of interacting with the metal component.

U.S. Pat. No. 4,853,737 discloses a roll useful in electrostatography having an outer layer comprising cured fluoroelastomers containing pendant polydiorgano-siloxane segments that are covalently bound to the backbone of the fluoroelastomer.

There is still a need for coating compositions based on fluorocarbon copolymers which resist abrasion, interact minimally with toners and resist offset while retaining the advantageous mechanical and chemical properties characteristic of fluoroelastomers.

SUMMARY OF THE INVENTION

The present invention relates to coated toner fusing members with improved resistance to toner interaction and abrasion.

The coated article of the invention, such as a fusing roller or fusing belt, comprises a substrate and coated thereon, or on an intermediate layer, a cured composition formed by heating a fluorocarbon copolymer with a fluorocarbon-curing agent in the presence of a curable polyfunctional poly($C_{1-6}$ alkyl)siloxane polymer. The concurrent curing of the components of the polymeric mixture creates an interpenetrating network of the individually cured polymers.

The coating composition is obtained by compounding the aforementioned polymeric components and the fluorocarbon-curing agent with a fluorocarbon-curing accelerator and one or more fillers to form a uniform, dry, flexible composite suitable for compression molding or dispersion in a solvent for thin coating applications.

DESCRIPTION OF THE PHOTOGRAPHS

Figure 3:
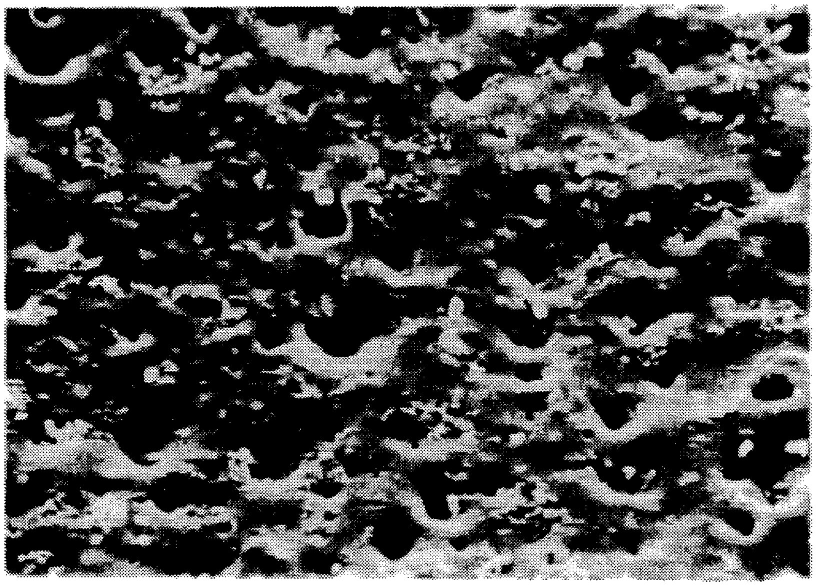

FIG. 3 is a photograph of the surface of a coating which is not of this invention at 2000 times magnification. A solvent-coated steel shim was prepared as described in Comparative Example 1 except that 120 g instead of 40 g of α-ω-aminopropyl terminated polydimethylsiloxane was added to the dispersion. The surface of the coating was magnified and photographed.

DETAILED DESCRIPTION OF THE INVENTION

The coated articles of the invention have a surface layer obtained by coating a substrate with a composition formed by compounding a mixture comprising a fluorocarbon copolymer, a fluorocarbon-curing agent, a curable polyfunctional poly($C_{1-6}$ alkyl)siloxane polymer, one or more fillers and an accelerator for promoting crosslinking between the curing agent and the fluorocarbon copolymer. The siloxane polymer is preferably heat-curable and is cured concurrently with the fluorocarbon copolymer. The siloxane polymer can comprise one or more polyfunctional poly($C_{1-6}$ alkyl)siloxane polymers, copolymers or reaction products of such materials. The term copolymers used herein refers to the product of polymerization of two or more substances at the same time, for example terpolymers which contain three distinct monomers.

While not wishing to be bound by theory it is believed that the concurrent curing of the individual polymers of the mixture results in an interpenetrating network of the separately crosslinked polymers. That is, the network formed by crosslinking the fluorocarbon copolymer with the fluorocarbon-curing agent and the network formed by crosslinking of the polyfunctional siloxane polymer mesh together to create an interpenetrating polymeric network. The cured polymeric mixture forms a coating with advantageous release properties attributable to the silicones and mechanical and chemical properties characteristic of the fluorocarbon copolymer are retained.

Fluorocarbon copolymers and silicones tend to phase separate under high shear or poor mixing conditions because, on a molecular level, they are incompatible and will not readily mix. Phase separation can be avoided by careful blending and compounding to form an intimate, homogeneous, solid mixture of the polymeric components and the addenda, such as the curing agent, accelerators and fillers. The solid composite thus obtained provides the conditions for forming an interpenetrating network. It is also found that on reducing the composite to fine particles and suspending them in a coating solvent, phase separation is avoided and, after coating and removing the solvent, a uniform solid layer is obtained. These novel composites are suitable for thin coating applications, such as solvent transfer coating and extrusion melt coating, however, they may also be molded or extruded to form articles and sheets of varying dimensions and thickness.

Figure 1:
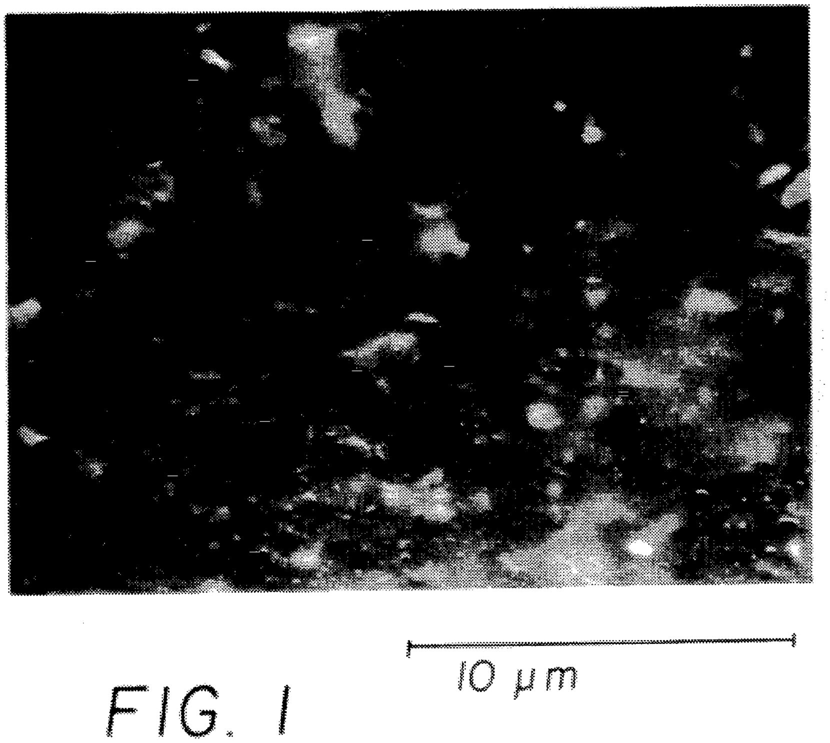
FIG. 1 is a photograph of the surface of a coating of the invention at 5000 times magnification. A solvent-coated stainless steel shim was prepared as described in Example 3 and the surface of the coating was magnified and photographed.
Figure 2:
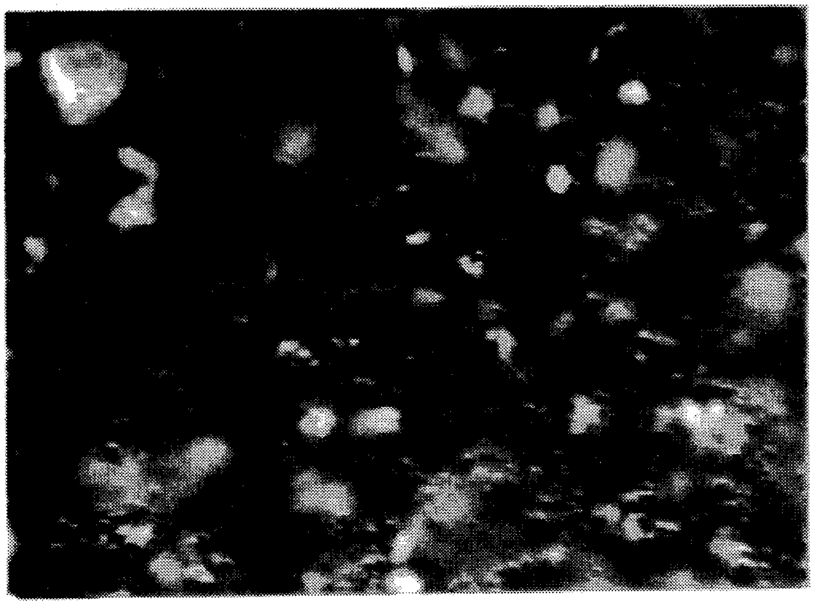
FIG. 2 is a photograph of the surface of a coating which is not of this invention at 5000 times prepared as described in Comparative Example 6 and the surface of the coating was magnified and photographed.

The minimization or elimination of the phase separation between the fluorocarbon copolymers and the silicones when combined according to this invention is evidenced by FIGS. 1 to 3. FIG. 1, a coating of this invention, and FIG. 2, a coating of a fluorocarbon polymer without added silicone, look essentially the same. FIG. 3, which is a coating of a fluorocarbon polymer and a silicone not combined by the process of this invention produces a coating with many holes in the coating surface. The holes in the surface are indicative of phase separation between the fluorocarbon polymer and silicone.

In a preferred embodiment of the invention the composite comprises a solid fluorocarbon copolymer and a liquid, curable polyfunctional poly($C_{1-6}$ alkyl)siloxane polymer, for example, a polyfunctional hydroxy-functionalized poly($C_{1-6}$ alkyl)siloxane polymer. The siloxane polymer preferably has a number average molecular weight range of greater than 20,000 when measured, for example, by size-exclusion chromatography (SEC). Such components do not readily form homogeneous mixtures due to phase separation. However, it has been determined that by compounding the polymeric components and the addenda in a designated sequence and under select conditions suitable composites can be obtained. The mechanical mixing is preferably carried out in a two-roll mill by compounding the fluorocarbon copolymer, the accelerator and fillers until a uniform, dry, smooth sheet is obtained. Subsequently the liquid, curable siloxane polymer is gradually added and blended into the compounded sheet on the mill so that the siloxane oil is uniformly distributed and in intimate contact with the fluorocarbon copolymer. The compounding process can be carried out at a temperature of, for example, from 50° to 70° F. (approx. 10° to 21° C.), preferably from 55° to 65° F. (approx. 13° to 18° C.). Compounding of the mixture prior to addition of the siloxane oil affords an even band in 30 to 60 minutes. Typically the siloxane oil is then added, initially at a very slow rate (e.g., for a 0.5 kilogram batch requiring about 80–100 g of silicone oil, the oil is added at a rate of 0.25 g every 5 minutes) until 50–80 weight percent of the oil has been added, then the remainder of the oil is added at about a ten fold increase in rate until addition is complete. The fluorocarbon-curing agent is then added and compounded in until a uniform, dry, flexible composite sheet is obtained. Variations in the rate of addition of the oil for different batch sizes and the order of addition of the components can be made by those skilled in the art without causing disintegration of the composite sheet. The composites obtained by such a process can be reduced to small particles for dispersing in a coating solvent without phase separation occurring. The particles are small enough to effect solution of the soluble components in less than about 5 hours, thus minimizing gel formation for compositions having a tendency to gel rapidly.

In another aspect of the invention, the fluorocarbon-curing agent and the curing accelerator are withheld from the compounding process until after the siloxane oil has been blended in, then they are added and compounded. The surface coatings thus obtained have a lower surface roughness.

In another aspect of the invention, the fillers and/or the curing agents are premixed with the silicone polymer after which they are added to the fluorocarbon copolymer in the compounding process.

In yet another aspect of the invention when a solvent transfer coating process is anticipated the fluorocarbon-curing agent can be withheld from the compounding mixture and added to the coating medium, thus minimizing any tendency for premature curing of the composite.

Suitable fluorocarbon copolymers of the invention include the vinylidene fluoride based fluoroelastomers containing hexafluoropropylene known commercially as Viton A. Also suitable are the terpolymers of vinylidene fluoride, hexafluoropropylene and tetrafluoroethylene known commercially as Viton B and Flouorel FX-9038. Viton A and Viton B and other Viton designations are trademarks of E.I. dupont de Nemours and Company. Other commercially available materials include, for example, vinylidene fluoride-hexafluoropropylene copolymers Flourel FX-2530, Fluorel FC 2174 and Fluorel FC 2176. Fluorel is a trademark of 3M Company. Other vinylidene fluoride based polymers which can be used are disclosed in U.S. Pat. No. 5,035,950, the disclosure of which is hereby incorporated by reference. Mixtures of the foregoing vinylidene fluoride-based fluoroelastomers may also be suitable. Although it is not critical in the practice of this invention, the number-average molecular weight range of the fluorocarbon copolymers may vary from a low of about 10,000 to a high of about 200,000. In the more preferred embodiments, the vinylidene fluoride-based fluoroelastomers have a number-average molecular weight range of about 50,000 to about 100,000.

Suitable fluorocarbon-curing agents or crosslinking agents for use in the process of the invention include the nucleophilic addition curing agents as disclosed, for example, in the patent to Seanor, U.S. Pat. No. 4,272,179, incorporated herein by reference. The nucleophilic addition cure system is well known in the prior art. Exemplary of this cure system is one comprising a bisphenol crosslinking agent and an organophosphonium salt as accelerator. Suitable bisphenols include 2,2-bis(4-hydroxyphenyl) hexafluoropropane, 4,4-isopropylidenediphenol and the like. Although other conventional cure or crosslinking systems may be used to cure the fluoroelastomers useful in the present invention, for example, free radical initiators, such as an organic peroxide, for example, dicumyl peroxide and dichlorobenzoyl peroxide, or 2,5-dimethyl-2,5-di-t-butylperoxyhexane with triallyl cyanurate, the nucleophilic addition system is preferred.

Suitable accelerators for the bisphenol curing method include organophosphonium salts, e.g., halides such as benzyl triphenylphosphonium chloride, as disclosed in U.S. Pat. No. 4,272,179 cited above.

Suitable fillers for producing these composites include mineral oxides, such as alumina, silicate or titanate, and carbon of various grades. Nucleophilic addition-cure systems used in conjunction with fluorocarbon copolymers can generate hydrogen fluoride and thus acid acceptors are added as fillers. Suitable acid acceptors include metal oxides or hydroxides such as magnesium oxide, calcium hydroxide, lead oxide, copper oxide and the like, which can be used as mixtures with the aforementioned fillers in various proportions.

The preferred curable polyfunctional poly($C_{1-6}$ alkyl)siloxane polymers, useful in the practice of this invention, when cured concurrently with the fluoro-elastomers produce a coating suitable for use as the surface coating of a fusing member. Such coated fusing members have low energy surfaces which release toner images with minimal offset. These coatings can also be advantageously used with small amounts of externally added polymeric release agents, for example mercapto functionalized polydimethylsiloxanes, to further minimize offset.

Preferred curable polyfunctional poly($C_{1-6}$ alkyl)siloxane polymers are heat-curable silicones, however peroxide-curable silicones can also be used with conventional initiators. Heat-curable silicones include the hydroxy-functionalized polyfunctional organopolysiloxanes belonging to the class of silicones known as "soft" silicones. Preferred soft silicones are silanol-terminated polyfunctional organopolysiloxanes containing repeating units of the formula, $$(R^1)_a\ SiO_{(4-a)/2}$$

wherein $R^1$ is $C_{1-6}$ alkyl and a is 0 to 3.

Alkyl groups which $R^1$ can represent include methyl, ethyl, propyl, isopropyl, butyl, sec.butyl, pentyl and hexyl. Preferred soft silicones are those in which $R^1$ is methyl.

The soft silicones can be used singly or as mixtures of silicones and can contain various proportions of mono-, di-, tri- and tetra-functional siloxane repeating units. Preferred soft silicones comprise a major component of a silanol- or trimethylsilyl-terminated polydimethylsiloxane having a number-average molecular weight between about 20,000 to 300,000 and a minor component of a polymethylsiloxane comprising monofunctional and tetrafunctional siloxane repeating units and having a number-average molecular weight in the range of 1,000 to 10,000.

Exemplary soft silicones are commercially available or can be prepared by conventional methods, for example, SFR-100 silicone (sold by General Electric Co.) and EC 4952 silicone (sold by Emerson Cummings Co.). SFR-100 silicone is characterized as a silanol- or trimethylsilyl-terminated polymethylsiloxane and is a liquid blend comprising about 60–80 weight percent of a difunctional polydimethylsiloxane having a number-average molecular weight of about 150,000, and 20–40 weight percent of a polytrimethylsilyl silicate resin having monofunctional (i.e. trimethylsiloxane) and tetrafunctional (i.e. $SiO_2$) repeating units in an average ratio of between about 0.8 and 1 to 1 and having a number-average molecular weight of about 2,200. EC 4952 silicone is characterized as a silanol-terminated polymethylsiloxane having about 85 mole percent of difunctional dimethylsiloxane repeating units, about 15 mole percent of trifunctional methylsiloxane repeating units and having a number-average molecular weight of about 21,000. Other polyfunctional poly($C_{1-6}$ alkyl)siloxane polymers which can be used are disclosed in U.S. Pat. Nos. 4,387,176 and 4,536,529, the disclosures of which are hereby incorporated by reference.

In one aspect of the invention a fluorocarbon-silicone composite is obtained which can be used as a fusing roll surface coating without adding release agents and without causing offset. Suitable fluorocarbon polymers are the terpolymers of vinylidene fluoride, hexafluoropropylene and tetrafluorethylene having a fluorine content of at least about 70 mole percent as disclosed in U.S. Pat. No. 5,035,950. The silicone component of the composite is a soft silicone, for example, a polymethylsiloxane composition such as SFR-100 silicone.

Preferred composites of the invention have a ratio of siloxane polymer to fluorocarbon copolymer between about 0.1 and 3 to 1 by weight, preferably between about 0.2 and 0.5 to 1. The composite is preferably obtained by curing a mixture comprising from about 50–70 weight percent of a fluorocarbon copolymer, 10–30 weight percent of a curable polyfunctional polymethylsiloxane polymer, most preferably about 20–30 weight percent. 1–10 weight percent of a fluorocarbon-curing agent, 1–3 weight percent of a fluorocarbon-curing accelerator, 8–30 weight percent of an acid acceptor type filler, and 10–30 weight percent of an inert filler.

Curing of the composite is carried out according to the well known conditions for curing vinylidene fluoride based copolymers ranging, for example, from about 12–48 hours at temperatures of between 50° C. to 250° C. Preferably the coated composition is dried until solvent free at room temperature, then gradually heated to about 230° C. over 24 hours, then maintained at that temperature for 24 hours.

In accordance with the present invention, the coated article can be a fusing member in the form of a roll, belt or any surface having a suitable configuration for fixing or fusing a thermoplastic toner image to a receiver such as a paper sheet. The underlying structure onto which the coating is applied is called the substrate. When used with fusing rolls, substrate onto which the composite of the invention can be coated directly on is the fusing roll core preferably the coating is applied on an underlying intermediate layer which is bonded directly or indirectly to the core. This intermediate layer is preferably a silicone elastomer, for example, EC 4952 silicone (sold by Emerson Cummings Co.). When the fusing member is in the form of a belt, the belt comprises a continuous flexible substrate made of metal or polymeric material onto which the composite of the invention can be coated. The fusing members can be coated by conventional techniques, however, solvent transfer coating techniques are preferred.

Coating solvents which can be used include polar solvents, for example, ketones, acetates and the like. Preferred solvents for the fluoroelastomer based composites are the ketones, especially methyl ethyl ketone and methyl isobutyl ketone. The composites of the invention are dispersed in the coating solvent at a concentration of between about 10 to 50 weight percent, preferably between about 20 to 30 weight percent and coated on the fusing member to give a 10 to 100 μm thick sheet on drying. The coated article is cured under the conditions described above.

The cured coatings of the invention have low surface energies and exhibit good adhesion to underlying layers and substrates. Such coatings have excellent resistance to abrasion as measured on a Norman Abrader apparatus and retain the advantageous mechanical and chemical properties characteristic of fluoroelastomers, such as hardness, elongation, tensile and tear strength and resistance to releasing oils. In addition, when evaluated as image-fixing media, the coatings have shown minimal reactivity with thermoplastic toner powders while showing desirable release properties with minimal or no offsettings under simulated fusing conditions.

The rolls and belts produced in accordance with the present invention are thus useful in electro-photographic copying machines to fuse heat-softenable toner to an image carrying receiver sheet. This can be accomplished by contacting a receiver, such as a sheet of paper, to which toner particles are electrostatically attracted in an imagewise fashion with such a fusing member. Such contact is maintained at a temperature and pressure sufficient to fuse the toner to the receiver.

The following examples illustrate the compounding, coating, curing and testing of fluorocarbon-silicone polymeric compositions.

The SFR-100 silicone used on the examples described below was obtained from General Electric Co. and was determined by size exclusion chromatography and NMR to consist essentially of a mixture of about 70 weight percent of a polydimethylsiloxane having a number-average molecular weight of about 91,000, and about 30 weight percent of a polytrimethylsilyl silicate resin having monofunctional and tetrafunctional repeating units in an average ratio of about 0.9 to 1 and having a number-average molecular weight of about 2,480.

EXAMPLE 1

Viton A fluoropolymer (400 g), benzyl triphenylphosphonium chloride (10 g), lead mono-oxide (60 g) and Stainless Thermax N990 carbon black (80 g) were thoroughly compounded for 60 minutes in a two-roll mill at 63° F. (approx. 17° C.) with water cooling until a uniform, dry composite sheet was obtained. SFR-100 silicone (80 g) was added to the composite sheet at a rate of 0.25 g every five minutes and allowed to band evenly before each addition. The temperature was maintained at 63° F. during the addition which took place over four days until approximately 65 g had been added. The balance of the oil was then added at a rate of 2 g every five minutes until addition was complete. The cooling water was turned off and milling was continued for one hour until a uniform smooth composite sheet was obtained. The cooling water was again turned on and 2,2-bis(4-hydroxyphenyl) hexafluoropropane (24 g) was added and milled for one hour. A uniform, dry, flexible composite sheet was thus obtained. This composite sheet was used to make various testing sample types. One testing sample type was a 75 mil compression-molded slab made according to the ASTM. The sample was cured for 20 minutes at 350° F.

under 45 tons of pressure and post cured for 48 hours at 450° F. Another testing sample type was a compression-molded slab cut into a dumbbell shape made according to ASTM D412-87. Yet another testing sample type was a solvent coated steel shim which was made according to the following description. The uniform, dry, flexible composite sheet obtained was divided into small pieces and suspended in methyl ethyl ketone to form a 20 weight percent coating dispersion. The dispersion was hand coated on a 50 micrometer stainless steel shim, air dried for 24 hours, heated to 450° F. (approximately 232° C.) over 24 hours, and cured at 450° F. (approximately 232° C.) for 24 hours. The thickness of the coating was approximately 1 mil.

The last sample type prepared was a coated fuser roller. It was made according to the following description. An aluminum core was cleaned and then primed with a thin layer of silicone primer and dried in ambient air before application of the base cushion. The base cushion, a 90 mil thick polydimethylsiloxane was blade coated to a dry thickness of 0.090 inches and cured for 24 hours at 70° F., 50% RH, 3 hours ramp to 410° F. and then 12 hours at 410° F. The roll was then surface ground and cured again for 24 hours ramp to 450° F. and then 24 hours at 450° F. After curing, the base cushion was corona treated for 1 minute at 750 watts, at 25 revolutions per minute. The same dispersion used to make the coated steel shim was ring coated onto the base cushion layer. The fuser roller was cured by air drying for 24 hours followed by 24 hours ramp to 450° F. and then 24 hours at 450° F. The dry thickness of the coating on the roller was 1 mil.

EXAMPLE 2

By following essentially the same procedure as described in Example 1 except that 40 parts of SFR-100 silicone per 100 parts of the Viton A fluoropolymer were used in the formulation, a uniform, dry, flexible composite sheet was obtained. A coated stainless steel shim was made as described in Example 1 using this composite.

EXAMPLE 3

The compounding process as described for Example 1 was repeated except that the benzyl triphenyl-phosphonium chloride was withheld from the initial phase of milling then, after the SFR-100 silicone had been blended in and a uniform, smooth composite was formed, it was milled into the composite along with the 2,2-bis(4-hydroxyphenyl-)hexafluoropropane . The resulting, uniform, dry, flexible composite was coated onto stainless steel shims as described for Example 1. The cured coating thus produced had a much lower surface roughness of 32 microinch (0.8 micrometer) compared to 73 microinch (approx. 1.82 micrometer) for Example 1. In addition to coated steel shims, compression molded slabs and a coated roller were made as described in Example 1 using this composite.

EXAMPLE 4

One hundred parts of Viton A fluoropolymer (a copolymer of vinylidene fluoride and hexafluoropropylene from E.I. dupont de Nemours & Co.), 15 parts of lead mono-oxide, 20 parts of Stainless Thermax N990 carbon black (from R.T. Vanderbilt Co.), 6 parts of 2,2-bis(4-hydroxyphenyl) hexafluoropropane and 2.5 parts of benzyl triphenylphosphonium chloride were thoroughly compounded on a two-roll mill until a uniform, dry composite was obtained. Twenty parts of liquid SFR-100 silicone were slowly blended into the compounded sheet on the mill, allowing the silicone oil to uniformly distribute throughout the entire composite without cracking or disintegration of the sheet.

EXAMPLE 5

The same procedure as described in Example 1 was followed except 400 g of Fluorel FX-9038 was added instead of 400 g of Viton A, no carbon black was added, and instead of 60 grams of lead mono-oxide, 12 g of magnesium oxide and 24 g of calcium hydroxide were added to the initial mixture to be compounded. In addition, no benzyl triphenylphosphonium chloride, nor 2,2-bis (4-hydroxy phenyl)hexafluoropropane were added to the mixture at any time, because curing agents are incorporated into the formulation of Fluorel FX-9038. A compression-molded slab of this compounded mixture and a solvent-coated fuser roller were prepared as described in Example 1.

EXAMPLE 6

The same procedure as described in Example 5 was followed except that 80 g of carbon black was added to the initial mixture for compounding. A compression-molded slab of this compound was prepared as described in Example 1.

EXAMPLE 7

The compounded mixture of Example 1 was used to make a coated roller with a compression-molded topcoat by the following steps. First, an aluminum roller core was sand blasted, cleaned and dried. Then the core was primed with known primers for silicone rubber materials. After air drying the primed core for ½ hour, it was placed in a pre-heated oven at 325° F. for 45 minutes. Next, the compounded mixture of Example 1 was divided into two pieces. (For a 20 mil roller 630 g of the mixture is used.) One piece consisting of half of the material was put into the bottom of a two-piece compression mold, the other piece was placed on the top of the roller core. The 2 piece mold, used to compression mold the compounded mixture onto the roller core was heated to 325° F. The compression mold was closed and opened at low pressure about five times to allow any trapped air to escape. Then, the press was closed at a pressure of 55 tons/in$^2$ for 2 hours.

After two hours, the mold was opened, and the roller was placed in an oven and cured for 24 hours ramp to 450° F. and 24 hours at 450° F.

COMPARATIVE EXAMPLE 1

800 g of Viton A was banded on a 2 roll mill. 160 g of carbon black, 120 g of lead mono-oxide, 20 g of triphenylphosphonium chloride and 48 g 2,2-bis(4- hydroxyphenyl) hexafluoropropane were mixed to obtain a uniform blend and then added across the length of the roll. The mixture was blended for 1 hour until a uniform composition was obtained.

The premilled blend and 40 g α-ω-aminopropyl terminated polydimethylsiloxane were dispersed in water-free methyl ethyl ketone with stirring for 12 hours. The dispersion was stirred slowly to avoid settling and kept sealed to prevent solvent loss. The dispersion was 10% solids by weight and had a viscosity of 22 cp. Two sample types were prepared. A coated fuser roller was prepared by ring-coating the dispersion onto the base cushion layer on an aluminum core. (The aluminum core and the base cushion layer were prepared as described in Example 1.) The coated roller was air dried for 24 hours, 24 hours ramp to 450° F, and then 24 hours at 450° F. The dry thickness of the roller coat Was 30 microns. A coated stainless steel shim was prepared as described in Example 1 using the dispersion of this Comparitive Example. The surface roughness of the shim stock coating was 12 microinch (approximately 0.30 micrometer).

COMPARATIVE EXAMPLE 2

The same procedure as described in Example 1 was followed except that 400 g of DC6-2230™, a heat curable hard silicone resin from Dow Corning was used instead of the 80 g of liquid SFR-100 silicone. DC6-2230 is characterized as a silanol terminated polymethyl phenyl siloxane containing a 1:1 methyl to phenyl ratio and approximately a 1:9 di- to trifunctional siloxane unit and having a number average molecular weight between 2,000 and 4,000. A coated stainless steel shim, a compression-molded slab and a dumbbell compression-molded slab were made from the compounded mixture as described in Example 1.

COMPARATIVE EXAMPLE 3

EC-4952[198] silicone supplied by Emerson Cummings, Inc. was used to make samples for testing. EC-4952 is characterized as a silanol-terminated polymethylsiloxane having about 85 mole percent of difunctional dimethylsiloxane repeating units, about 15 mole percent of trifunctional methylsiloxane repeating units and having a number-average molecular weight of about 21,000. EC-4952 has incorporated into its formulation aluminum oxide and iron oxide fillers. EC-4952 without any additional materials was used to make all four sample types as described in Example 1.

COMPARATIVE EXAMPLE 4

Same as Example 6 except that 400 g FX-2530, a fluorocarbon copolymer which is 69% fluorine, was added instead of 400 g FX-9038 and no SFR-100 was added. The composite was used to make a compression-molded slab.

COMPARATIVE EXAMPLE 5

Same as Comparative Example 4 except no carbon black was added. The composite was used to make a compression-molded slab.

COMPARATIVE EXAMPLE 6

Same as Comparative Example 1 except no amino polydimethyl siloxane was added when the compounded mixture was dispersed in the methyl ethyl ketone solution. The compounded mixture was used to make a compression-molded slab, a dumbbell, and a solvent coated steel shim as described in Example 1.

Testing of Fluorocarbon Copolymer-Silicone Composites

Release Test

The coated stainless steel shim from Example 1 was mounted on a test roller to evaluate the release properties under simulated fusing conditions. A cyan-toned image (butylacrylate/styrene copolymer as binder) and a yellow-green-toned image (polyester as binder), printed on laser-print paper released from the coated shim with no visible trace of offset, while the shims of CE 1 failed to release, indicating severe toner offset, under the following fusing conditions:

| | |
|---|---|
| Fusing Temperature | 260° F. |
| Release Temperature | 120° F. (approx. 50° C.) |
| Speed | 1 inch/sec. (approx. 2.54 cm/sec.) |
| Pressure | 10 psi (approx. 7,000 $Kg/m^2$) |
| Nip Width | 100 mils (approx. 2.5 mm) |
| Pressure Roller | Fluorinated Ethylenepropylene (FEP supplied by Dupont) over Silicone Elastomer (Silastic J. supplied by Dow Corning Corp.) |

Instron Peel Test

Coated stainless steel strips were laminated against acrylic tape (from 3M Corp.) and peel tests were conducted on an Instron apparatus with a 180° peel angle and a peel rate of 1 cm/min. The sample strips were held stationary in the lower clamp and the tape was peeled from the coating by moving the upper clamp assembly. The results are tabulated in Table 1.

TABLE 1

| Sample | Peel Force (Kg) as Function of Displacement (mm) | | | | | | |
|---|---|---|---|---|---|---|---|
| | 5 mm | 10 mm | 15 mm | 20 mm | 25 mm | 30 mm | 35 mm |
| Ex. 2 | 0.001 | 0.001 | 0.001 | 0.001 | 0.001 | 0.001 | — |
| Ex. 3 | 0.006 | 0.005 | 0.008 | 0.007 | 0.007 | 0.008 | 0.008 |
| CE 1 | 0.35 | 0.31 | 0.32 | 0.33 | 0.33 | 0.35 | 0.33 |
| CE 2 | 0.43 | 0.44 | 0.43 | 0.44 | 0.44 | 0.44 | — |
| CE 3 | 0.000 | 0.000 | 0.000 | 0.000 | — | — | — |

The coatings of Examples 2 and 3 and Comparative Example 3 have much lower affinity toward the acrylic tape than Comparative Examples 1 and 2.

Oil Release Test

The minimum amount of release oil needed for adequate release from a fuser roller of paper or transparencies bearing polyester toners was measured for several fuser rollers.

This test was run on a fuser system consisting of a fuser roller and a pressure roller. The fuser rollers were made according to the previous descriptions. The pressure roller was a 1.96 inch diameter DuPont Silverstone™ coated steel roller. The pressure of the fuser system was 14 psi; the temperature was 360° F. One milliliter of mercaptan polydimethylsiloxane release oil (viscosity 270 cps) was applied to the rotating rollers, and then paper or transparencies were run through the fuser system until image artifacts on the roller were first observed. At this point another 1 milliliter of oil was applied to the rollers and the same number of blank paper or transparencies were run through the fuser and the last sheet was analyzed for silicone oil. The amount of oil per page when image artifacts began to appear on each fuser roller is recorded in Table 2 for both paper and transparencies.

TABLE 2

| Oil Release Test | | |
|---|---|---|
| Sample | Release Oil (mg/page) Paper | Transparency |
| Ex. 1 | 0.6 | 2.1 |
| Ex. 3 | 9.5 | 1.2 |

TABLE 2-continued

| Oil Release Test | | |
|---|---|---|
| Sample | Release Oil (mg/page) Paper | Transparency |
| CE 1 | 4.6 | 2.8 |
| CE 3 | 0.6 | 1.0 |

The fuser roller of Example 1 required less oil for release of paper than the fuser rollers of Example 3 and Comparative Example 1, because Example 1 had higher surface roughness. The smoother surface of the fuser roller of Example 3 is the reason it required less oil for release of a transparency than the roller of Example 1 or Comparative Example 1. Although release oils were used in this test, release oils are not always required in fuser systems using fuser rollers of this invention.

Mechanical Properties

Shore A was measured for 75 mil compression-molded slabs of the sample coatings on a Shore A Durometer. Samples of various coating materials were evaluated by stress-strain tests on an Instron 4206 series I instrument. Tensile strength at peak (stress at failure) and elongation at peak were measured on 75 mil compression-molded dumbbells according to ASTM D412-87. The tear strength was measured according to ASTM D624-86. The results of these tests are in Tables 3 and 4.

TABLE 3

| Mechanical Properties | | | | |
|---|---|---|---|---|
| Sample | Shore A | Tensile (PSI) | % Elongation | Tear (lb/in) |
| Ex 1 | 68 | 1120 | 158 | 90 |
| CE 2 | 89 | 701 | 8.4 | 167 |
| CE 3 | 66 | 616 | 80 | 30 |
| CE 6 | 72 | 1200 | 120 | 110 |

Higher tensile strengths usually indicate more wear resistant coating materials for fuser rollers. Higher percent elongation values are usually an indication of longer life, because the samples with higher elongation values at failure usually exhibit better fatigue resistance. In addition, higher tear strength has been correlated with improved abrasion resistance.

The mechanical properties for the 20 parts SFR 100 incorporated Viton-silicone roller, Example 1 are comparable to those for Viton without added silicone, CE 6 and better than those for the other Comparative Examples. Surprisingly, the results in Table 4 indicate that the coatings of this invention maintain the excellent mechanical properties of the fluorocarbon copolymer, even though silicone polymer has been added to the coating materials.

Surface Energy Measurement and Wear Rate

The surface tension of compression molded slabs of the coating materials were obtained from contact angle measurements.

The wear rate test of compression-molded slabs was performed using a Norman Abrader Device (Norman Tool Inc., Ind.). For this test, the Abrader Device was modified by replacing the standard grommet wheel with an aluminum rod (1.1 inch in length and 0.625 inch in diameter), placing a renewable paper strip on the samples, and running the tests at about 350° F. After 1600 cycles, the Step, which is the height of the indentation in the slab of the coating material was measured for each slab. The Surface Roughness was measured by a Surface Profilometer before and after the abrasion test. The results of the tests are tabulated in Table 4.

The same tests were repeated except that the coated stainless steel shims were used. Step measurements were made after 10, 25, 50 and 100 cycles. The results of these tests are tabulated in Table 5.

TABLE 4

Norman Abrader Test on compression-molded slabs

| Sample | Surface Tension (dynes/cm) | Step (mils) | Initial Surface Roughness (μ in.) | Final Surface Roughness (μ in.) |
|---|---|---|---|---|
| Ex. 1 | — | 0.2 | 6 | 6 |
| Ex. 1 | 18.7 | 0.16 | 10 | 10 |
| Ex. 3 | 12.9 | 0.27 | 10 | 20 |
| Ex. 5 | 11.6 | 0.40 | 10 | 28 |
| Ex. 6 | 22.1 | 0.77 | 11 | 53 |
| CE 3 | 22 | 1.60 | 113 | 166 |
| CE 4 | 22.0 | 0.63 | 6 | 28 |
| CE 5 | 27.4 | 0.33 | 9 | 14 |
| CE 6 | 39 | 0.33 | 7 | 10 |

TABLE 5

Norman Abrader Test on Coated Stainless Steel Shims

| Sample | Surface Tension (dynes/cm) | 10 cycles | 25 cycles | 50 cycles | 100 cycles |
|---|---|---|---|---|---|
| Ex. 2 | 27 | 0.3 | 0.3 | 0.4 | 0.4 |
| Ex. 3 | 24 | — | — | 0.6 | 0.8 |
| CE 1 | 21 | Wore through on 1st cycle | | | |
| CE 2 | 32 | 0.3 | 0.6 | 11.0 | 1.4 |
| CE 6 | 31 | 0.2 | wore through | | |

Some fluorocarbon copolymers have poor toner release properties due to their higher surface energies. As shown in Tables 4 and 5, the coating materials of this invention exhibit surprisingly low surface energies.

The data from the Norman Abrader test in Table 4 indicates that the coatings of this invention maintained fairly constant Surface Roughness values. Unlike a coating of this invention, none of the Comparative Examples maintained the same Surface Roughness over the course of the abrasion test. Also from the data in Table 4, coatings of this invention exhibited the smallest Steps as a result of the abrasion test.

From the results of the wear tests performed on the coated stainless steel shims, the abrasion resistence of the coatings of CE 1 and CE 6 was so poor that the coatings wore through after fewer than 25 cycles, whereas the coatings of this invention survived more than 100 cycles. The results of these tests indicate that the most abrasion resistant coating materials were the ones made according to this invention.

Mechanical Energy Resolver Test

The coating materials' response to cyclic stress was determined using an Instrumentors Inc., Model 1100 BE Mechanical Energy Resolver (MER). The MER quantifies the change in Storage Modulus and Fractional Elongation at elevated temperature as a function of dynamic compression stress. The test was performed at 218° C. on six compression-molded slabs stacked in the MER. The load was kept constant at 8 kg and superimposed on this was a sinusoidally varying load of 4kg rms. The results of this test are compiled in Tables 6 and 7.

TABLE 6

Storage Modulus (MPa) Vs. Time

| Sample | 5 hrs | 10 hrs | 20 hrs | 30 hrs | 40 hrs | 50 hrs | 60 hrs |
|---|---|---|---|---|---|---|---|
| Ex. 3 | 2.3 | 2.4 | 2.3 | 2.3 | 2.3 | 2.3 | 2.3 |
| CE 3 | 6.0 | 5.7 | 7.0 | 8.3 | 9.0 | 10.0 | 11.0 |
| CE 6 | 7.4 | 7.4 | 7.4 | 7.2 | 7.2 | 7.2 | 7.1 |

TABLE 7

Fractional Length vs. Time

| Sample | 10 hrs | 20 hrs | 30 hrs | 40 hrs | 50 hrs | 60 hrs |
|---|---|---|---|---|---|---|
| Ex. 3 | 0.98 | 10.97 | 0.95 | 0.95 | 0.94 | — |
| CE 3 | 0.6 | 0.5 | 0.43 | 0.4 | 0.38 | 0.37 |
| CE 6 | 0.99 | 0.98 | 0.98 | 0.98 | 0.98 | 0.97 |

The Storage Modulus is a measure of the hardness of a slab of coating material. Ex. 3 is softer than the Comparative Examples, but what is more important is that its Storage Modulus remained constant for the whole test.

The fractional change in length for Ex. 3 remained fairly constant as did the fractional change in length of CE 6 which is a coating material made of Viton A (fluorocarbon copolymer) without any silicone. This result indicates that the excellent mechanical properties of the fluorocarbon copolymer are maintained in the coatings of this invention despite the addition of the silicone polymer. CE 3, the red rubber sample, had a large change in length.

Out of the examples above, Ex. 3 has the best combination of properties for a fuser roller, because it is relatively soft, but its Storage Modulus and fractional length remained relatively constant when stressed. A soft material with a constant Storage Modulus is desirable for a fuser roller coating, because a suitable nip area can be formed using less pressure than for a hard material, and the characteristics of the coating will remain constant when the fuser roller is used.

Toner Post Reactivity Test

Coated steel shims were used to test the reaction between fused toner and the release coatings on the fuser roller surface. The coating samples were contacted with toner-bearing paper placed under a 20 g weight and placed in an oven at 190° C. The results of contacting the coating samples with polyester toner, made by Eastman Kodak Co., 3 color laydown, $D_{max}$=1.5 mg/cm$^2$ are compiled in Table 8. The results of contacting the coating samples with CB Piccotoner™ 1221, a styrene butadiene toner, available from Hercules, $D_{max}$=0.75 mg/cm$^2$ are compiled in Table 9.

The numbers in Tables 8 and 9 correspond to the following reactivity of the toners with the coatings:

0=no offset

1=removable, slight offset

2=removable, extensive offset

3=non-removable, slight offset

4=non-removable, extensive offset

5=paper stuck on the coating

TABLE 8

| Toner Post Reactivity Test | | | |
|---|---|---|---|
| Sample | 20 min | 30 min | 30 min (repeated test) |
| Ex 1 | 0.5 | 1.5 | 2.0 |
| Ex 2 | 1 | 1 | 1.5 |
| CE 1 | 4.5 | 4 | 5 |
| CE 2 | 1.5 | 3.5 | 4 |
| CE 3 | 0 | 2 | 1.5 |

TABLE 9

| Toner Post Reactivity Test | | |
|---|---|---|
| Sample | 20 min | 45 min |
| Ex 1 | 0.5 | 0 |
| Ex 2 | 1.0 | — |
| CE 1 | 5.0 | 5.0 |
| CE 2 | 1.0 | 2.5 |
| CE 3 | 1.0 | 5.0 |

The coatings of this invention showed the least interaction with both types of toners as compared to the much greater interaction of the comparative release coating materials with the toners.

The Oil-less Fusing Window Test

The fusing temperature range is the range of temperatures within which toner is fused to a receiver and does not offset onto a fusing member. The fusing temperature range is also referred to as the fusing window or FW. The FW is equal to the difference between the hot offset temperature ($T_{off}$) and the minimum temperature at which the toner is acceptably fixed to the receiver ($T_{min}$). At the hot offset temperature, cohesive forces within the toner are less than the adhesive forces between the toner and fusing member surface; therefore, toner will adhere to or offset onto the fusing member. The FW is dependent on the toner, release agents added to the toner, the surface of the fusing member and release oils coating the fusing member. In the following test no release oils were used to coat the surface of the fusing members.

The toner used in this test was Almacryl B-1509™, a styrene acrylate toner available from Image Polymers. The Almacryl B-1509 has incorporated into its formulation a polypropylene wax release additive. The amount of the polypropylene wax incorporated into the toner is indicated in Table 10. The fuser system was that of an Ektaprint-150 copier machine made by Eastman Kodak Company except the sample fuser rollers were substituted into the system. The fuser speed was 4 inches per second. The FW's for the fuser rollers are recorded in Table 10.

TABLE 10

| Oil-less Fuser Window Test | | | | | | |
|---|---|---|---|---|---|---|
| Toner | Ex. 5 | | | CE 3 | | |
| Release Agent | $T_{min}$ (°F.) | $T_{off}$ (°F.) | FW (°F.) | $T_{min}$ (°F.) | $T_{off}$ (°F.) | FW (°F.) |
| None | 225 | 425 | 200 | 200 | 300 | 100 |
| 5 pph | 200 | 425 | 225 | 200 | 325 | 125 |
| 10 pph | 200 | 450* | 250 | 200 | 350 | 150 |

*450° F. was the maximum temperature of the fuser system.

The oil-less fuser window test indicates that the fuser windows for the fusing member of this invention, Ex. 5, are much greater than for the red rubber fuser roller of CE 3. A fuser roller with a larger fuser window usually has less toner offset and a longer life. Of particular importance is that the coatings of this invention achieved such large fuser windows, over 250° F., without the use of a release oil on the fuser roller. Eliminating the need for release oil on a fusing member simplifies the fuser system and eliminates all of the problems, which are well known in the art, associated with the application of release oil.

The oil-less fuser window test was repeated using other toner binders with and without release agents and the results were similar to the results reported in Table 10 for the Almacryl B-1509.

The coated articles of this invention, particularly the fuser rollers, possess extremely desirable physical and mechanical characteristics as indicated in the tests results above. The fuser rollers have excellent toner release properties, without sacrificing toughness and abrasion resistance, and large fuser windows even when no release oil is used. The coating materials exhibit these desirable properties when they are prepared according to the process of this invention.

Although the invention has been described in detail with particular reference to certain preferred embodiments thereof, it should be appreciated that variations and modifications can be effected within the spirit and scope of the invention.

What is claimed is:

1. A coated article comprising a substrate, and a surface layer coated thereon or on an intermediate layer, said surface layer being of a composition formed by curing a polymeric composition comprising fluorocarbon copolymer, fluorocarbon-curing agent, and siloxane polymer comprising one or more curable, silanol-terminated, polyfunctional poly($C_{1-6}$ alkyl)siloxane polymers, said siloxane polymer comprising at least two different functional siloxane units selected from the group consisting of monofunctional, difunctional, trifunctional and tetrafunctional siloxane units, and creating an interpenetrating network consisting essentially of separately crosslinked polymers, said fluorocarbon polymer and said fluorocarbon curing agent forming one said crosslinked polymer, and said siloxane polymer forming a second crosslinked polymer.

2. A coated article according to claim 1, wherein said polymeric composition further comprises an accelerator for curing said fluorocarbon copolymer with said fluorocarbon-curing agent.

3. A coated article according to claim 1, wherein said polymeric composition further comprises a filler.

4. A coated article according to claim 1, wherein said fluorocarbon copolymer is a copolymer of vinylidene fluoride and hexafluoropropylene.

5. A coated article according to claim 1, wherein said fluorocarbon-curing agent is 2,2-bis(4-hydroxyphenyl) hexafluoropropane.

6. A coated article according to claim 1, wherein said curable polyfunctional poly($C_{1-6}$ alkyl)siloxane polymer is a heat-curable polymer.

7. A coated article according to claim 6, wherein said curable polyfunctional poly($C_{1-6}$ alkyl)siloxane polymer comprises a silicone polymer comprising repeating units of the formula, $$(R^1)_aSiO_{(4-a)/2}$$

wherein $R^1$ is $C_{1-6}$ alkyl and a is 0–3.

8. A coated article according to claim 7 wherein $R^1$ is methyl.

9. A coated article according to claim 8, wherein said silicone polymer comprises a polydimethylsiloxane having a number average molecular weight of between about 20,000 to 300,000 and a polymethylsiloxane comprising monofunctional and tetrafunctional siloxane repeating units and having a number-average molecular weight in the range of 1,000 to 10,000.

10. A coated article according to claim 9 wherein said silicone comprises a silanol- or trimethylsilyl-terminated polymethylsiloxane and is a liquid blend comprising about 60–80 weight percent of a difunctional polydimethylsiloxane having a number-average molecular weight of about 150,000, and 20–40 weight percent of a polytrimethylsilyl silicate resin having monofunctional and tetrafunctional repeating units in an average ratio of between about 0.8 and 1 to 1, and having a number-average molecular weight of about 2,200.

11. A coated article according to claim 1, wherein said article is a toner fusing member.

12. A coated article according to claim 1, wherein said fluorocarbon copolymer is a terpolymer of vinylidene fluoride, tetrafluoroethylene and hexafluoropropylene.

13. A coated article according to claim 1, wherein said composition comprises about 50–70 weight percent of a fluorocarbon copolymer, about 20–30 weight percent of a curable polyfunctional polymethyl siloxane polymer, about 1–10 weight percent of a fluorocarbon curing agent, about 1–3 weight percent of a fluorocarbon-curing accelerator, 8-30 weight percent of an acid acceptor filler and 10–30 weight percent of an inert filler on a 100 weight percent basis.

14. A coated article according to claim 1, wherein said polyfunctional poly($C_{1-6}$ alkyl)siloxane polymer and said fluorocarbon copolymer are present in said polymeric composition in a ratio of between about 0.1 and 3 to 1 by weight.

15. A coated article according to claim 14 wherein said polymeric composition, the ratio of polyfunctional poly($C_{1-6}$ alkyl) siloxane copolymer to fluorocarbon copolymer is between about 0.2 and 0.5 to 1 by weight.

* * * * *